(12) United States Patent
West, Jr.

(10) Patent No.: US 7,127,748 B2
(45) Date of Patent: Oct. 31, 2006

(54) INCINERATING COMMODE

(76) Inventor: James Ira West, Jr., 7864 Fielder Rd., Jonesboro, GA (US) 30236

( * ) Notice: Subject to any disclaimer, the term of this patent is extended or adjusted under 35 U.S.C. 154(b) by 123 days.

(21) Appl. No.: 10/872,987

(22) Filed: Jun. 21, 2004

(65) Prior Publication Data

US 2004/0226494 A1 Nov. 18, 2004

Related U.S. Application Data

(62) Division of application No. 10/224,534, filed on Aug. 20, 2002, now Pat. No. 6,763,528.

(51) Int. Cl.
A47K 11/02 (2006.01)
(52) U.S. Cl. ............................. 4/111.1; 4/463
(58) Field of Classification Search ................ 4/111.1, 4/111.4, 111.5, 111.6, 317, 462, 463, 340, 4/341
See application file for complete search history.

(56) References Cited

U.S. PATENT DOCUMENTS

| | | | |
|---|---|---|---|
| 1,290,615 A | 1/1919 | McGary | 4/322 |
| 3,548,421 A | 12/1970 | Valdespino | 4/111.4 |
| 3,577,568 A | 5/1971 | Johansen | 4/317 |
| 3,694,825 A | 10/1972 | Kufrin et al. | 4/111.3 |
| 3,752,090 A | 8/1973 | Frankel et al. | 4/111.3 |
| 3,816,857 A | 6/1974 | West, Jr. | 4/1.3 |
| 3,855,645 A | 12/1974 | West, Jr. | 4/111.3 |
| 3,885,254 A | 5/1975 | West | 4/111.3 |
| 3,911,506 A | 10/1975 | West, Jr. | 4/111.3 |
| 3,994,028 A | 11/1976 | Abom et al. | 4/111.4 |
| 4,122,557 A | 10/1978 | Harris | 4/111.3 |
| 4,138,331 A | 2/1979 | Frankel et al. | 110/345 |
| 4,148,103 A | 4/1979 | Nishioka | 4/111.1 |
| 4,162,656 A | 7/1979 | Dallen et al. | 110/221 |
| 4,999,857 A | 3/1991 | Mohrman | 4/111.1 |
| 5,261,126 A | 11/1993 | Kishi | 4/111.5 |
| 5,881,475 A | 3/1999 | Kishimoto et al. | 34/381 |
| 5,991,931 A | 11/1999 | Hawkins et al. | 4/111.4 |
| 6,763,528 B1 * | 7/2004 | West | 4/111.4 |

* cited by examiner

*Primary Examiner*—Robert M. Fetsuga
(74) *Attorney, Agent, or Firm*—George M. Thomas; James W. Kayden; Harold L. Marquis

(57) ABSTRACT

An improved incinerating commode for the disposal of human waste through injection of a combustible fluid into the chamber where the waste is incinerated, separation of the urine component from the fecal component of human waste, and use of the urine component mixed with a cleaning fluid to steam clean and cool the chamber that incinerates the waste.

2 Claims, 4 Drawing Sheets

INCINERATING COMMODE

This application is a divisional of U.S. utility application entitled, "INCINERATING COMMODE," having Ser. No. 10/224,534, filed Aug. 20, 2002 which issued as U.S. Pat. No. 6,763,528 on Jul. 20, 2004, which is entirely incorporated herein by reference.

BACKGROUND OF THE INVENTION

The invention relates to an apparatus for use in disposing of human waste and is more particularly concerned with a commode capable of incinerating waste.

In the field of human waste disposal, a number of methods have been employed for disposing of the solid and liquid waste. Commonly, sewage treatment plants are provided which are connected via sewage pipelines to domestic and commercial facilities. As population has increased, the capabilities of the sewage treatment plants have been severely strained. In remote areas where sewage treatment facilities are not available, septic tank means are often employed to dispose of the human waste. A septic tank utilizes bacterial action in the tank to dispose of solid waste and utilizes a subterranean drainage field for disposing of the liquid waste. However, in certain areas where the soil conditions are not satisfactory, utilization of septic tanks creates unhealthy conditions in their use. A number of municipalities have adopted strict codes to regulate the use of septic tanks.

In remote areas where a sewage treatment facility is not available and wherein septic tanks are not feasible, oxidation ponds are employed to dispose of human waste. In utilizing oxidation ponds, a fungus is utilized to dispose of the solid waste with the liquid waste being disposed of through evaporation or surface drainage means. The use of oxidation ponds requires a large ground area and is unattractive in appearance.

A number of attempts have been made to devise chemical and incinerating. commode facilities for use in disposing of human waste. However, the prior art chemical and incinerating human waste disposal apparatuses are extremely complex in construction and operation, uneconomical to manufacture and unreliable in performance. A primary disadvantage of prior art incinerating commodes is the cyclic time required to complete an incinerating operation and cool the commode for use.

The inventor has personally worked over twenty years in devising improvements in incinerating commodes. The inventor has received U.S. Pat. Nos. 3,816,857; 3,885,254; 3,855,645; and 3,911,506 each encompassing improvements in incinerating commode technology. However, while these prior commodes worked for their intended purpose, the cycle time, heat of combustion, and cleaning of the commode bowl all could be improved. The inventor has worked diligently in producing an economical and operational feasible incinerating commode.

Accordingly, it is an object of the present invention to provide an incinerating commode which has an improved cycle time for the incineration of the waste.

Another object of this invention is to provide an incineration commode that uses a combustible fluid to improve the efficiency of the incineration of human waste.

Another object of this invention is to provide an incineration commode that separates the urine component from the fecal component of human waste to cause the fecal component to burn more efficiently.

Another object of this invention is to provide an incineration commode that uses the separated urine component mixed with a cleaning fluid to cool and steam clean the chamber in which the fecal component is incinerated.

Additionally, it is an object of the present invention to regulate the burn of the fecal matter to ensure a quick and even burn, hence decreasing the burn cycle time.

SUMMARY OF THE INVENTION

The present invention contemplates a novel and improved commode for the incineration of human waste. The present invention is improved over prior art incinerating commodes by the utilization of at least one of the following or a combination thereof: injecting a combustible fluid into the chamber where the waste is incinerated; separating the urine component from the fecal component of human waste; or maintaining a constant air pressure within the fecal matter burn chamber to ensure a quick and even burn of the fecal matter.

In one embodiment, a combustible fluid is injected into the chamber that burns the waste. This combustible fluid mixed with the waste burns more efficiently because the combustible fluid decreases the amount of time needed to incinerate the waste. The invention further contemplates separating the urine and fecal components of human waste. Since the urine component of human waste inhibits the incineration of the fecal component, the efficiency of the incineration process is increased when the urine component is removed.

In addition to increasing the efficiency of the incineration process, separating the urine component has the added advantage of providing a fluid that can be used to cool the chamber in which the fecal component is incinerated and also utilizes the urine which otherwise would require burning. The urine component mixed with a cleaning fluid can be sprayed onto-the incineration chamber to steam clean and cool the chamber. This process reduces the amount of time in which the commode cannot be used due to the heat associated with the incineration process.

In another embodiment a counter-balance grate controls the amount of air pressure within the fecal matter burn chamber to ensure a quick and even bum of the fecal matter.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

PREFERRED EMBODIMENT

Figure 1:
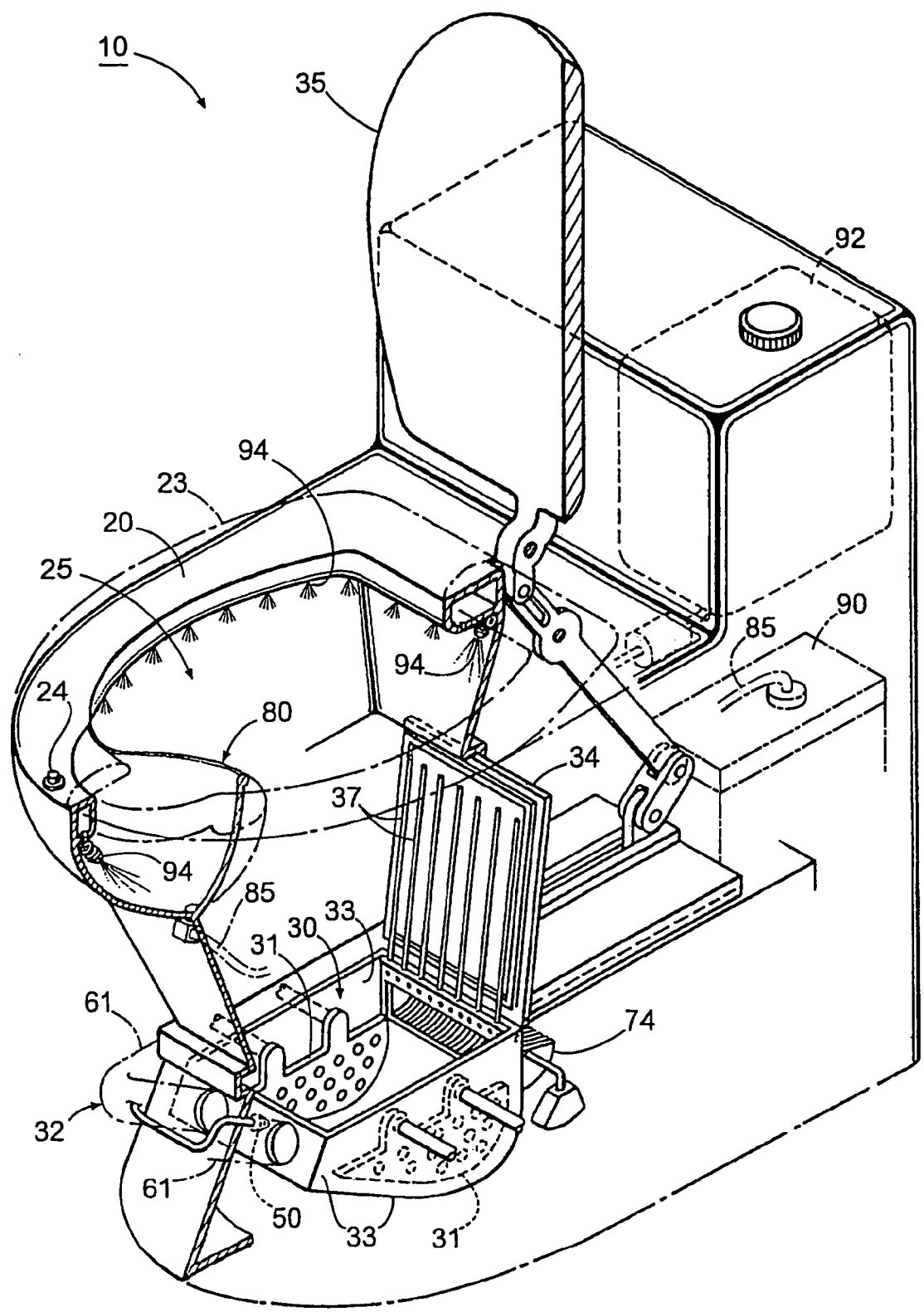
FIG. 1 is a cut-view of the incinerating commode according to the present invention.
Figure 2:
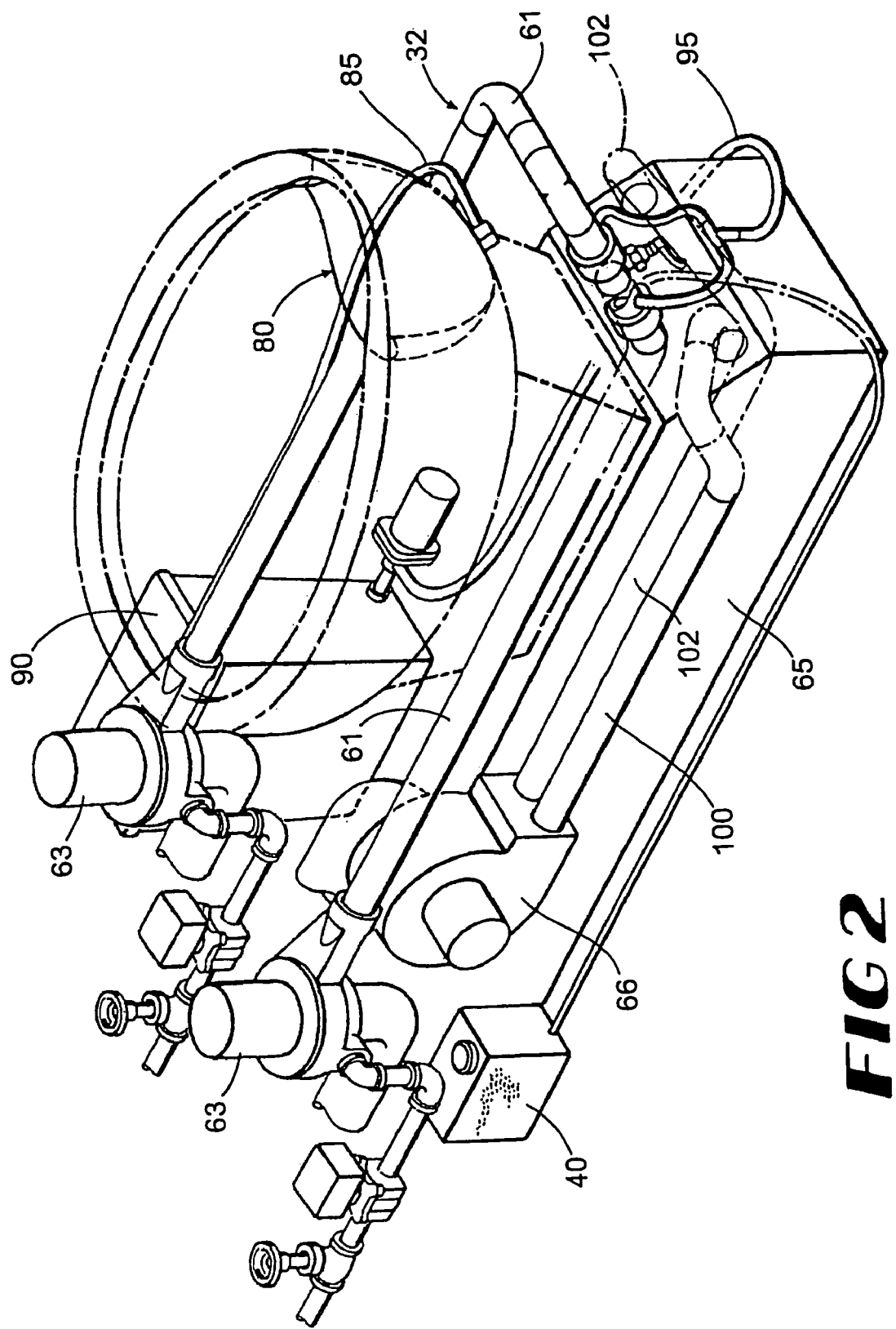
FIG. 2 is a perspective of the incinerating commode according to the present invention for incinerating fecal matter.

Referring now in more detail to the drawings, as can be seen in FIGS. 1 and 2, an incinerating commode 10 capable of disposing of human waste is shown according to one presently preferred embodiment of the invention. In a first embodiment, the incinerating commode 10 consists of a commode body 20 which defines a commode interior 25. A combustion chamber 30 is disposed in communication with the commode interior 25 for receiving a fecal component of said human waste. A combustible fluid system 32 provides combustible fluid to the combustion chamber 30 for intermixing with the fecal component.

As illustrated in FIG. 1, the commode body 20 has a bottom opening which communicates with combustion chamber 30. A conventional seat element 23 is carried by the commode body 20. The commode seat 23 is pivotally supported on the commode body 20. A pressure sensitive button 24 is located beneath commode seat 23 for activating a pre-heating element hereinafter described, a vacuum system hereinafter described, and a bowl cleaning system hereinafter described.

Figure 3:
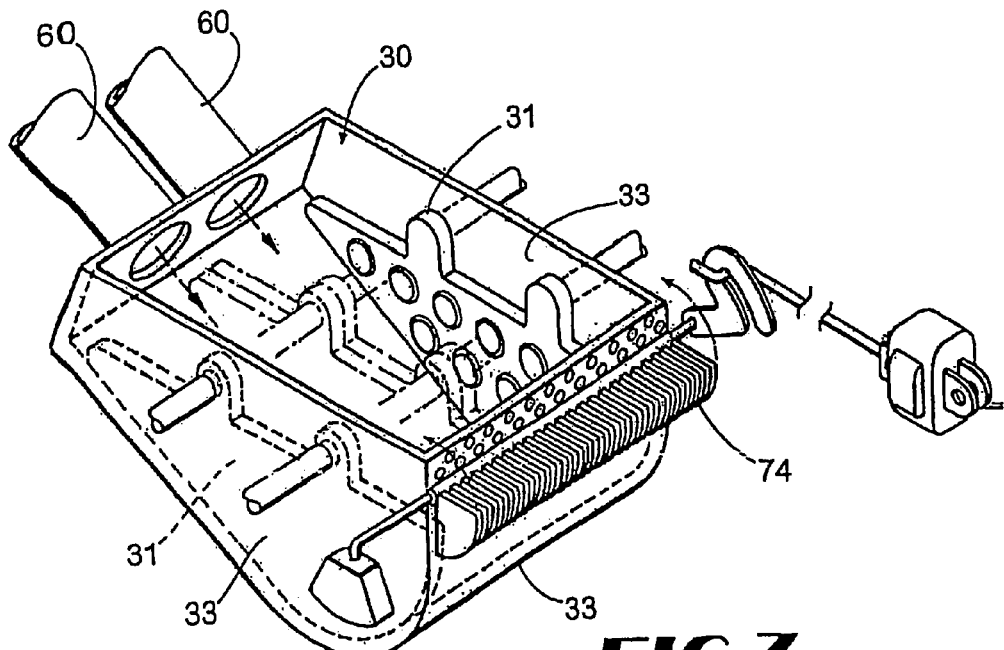
FIG. 3 is a perspective of the combustion chamber according to the present invention.

As shown in FIGS. 1 and 3, the combustion chamber 30 is defined by sidewalls and bottom wall 33, and a lid 34. Combustion chamber lid 34 is connected to commode lid 35 such that combustion chamber lid 34 is closed when commode lid 35 is positioned downward. Combustion chamber lid 34 provides an airtight seal when in a closed position providing for a secure combustion chamber. In the preferred embodiment, chamber lid 34 includes offset tines 37 for pushing toilet tissue into the combustion chamber. Offsetting meshers 31 are provided within the combustion chamber. Meshers 31 are each provided with a motor driven solenoid for moving the meshers inwardly into substantial abutting contact with each other and then advance laterally outward to a position adjacent to the sidewalls. During the inward movement of the meshers, trapped material is broken up into smaller pieces. Smaller pieces of waste are incinerated more efficiently.

The combustion chamber lid 34 is pivotally connected to the combustion chamber 30 and supports movement from an open position to a closed position. In the open position, waste and paper can be transferred into the combustion chamber 30 and movement of the combustion chamber lid 34 seals the combustion chamber for the incineration process to occur.

As shown in FIG. 2, the combustible fluid system includes a combustible fluid housing 40 which stores a combustible fluid. The combustible fluid housing 40 is in fluid communication with the combustible fluid injector 50 by a fuel conduit, which in one embodiment is a flexible fuel line. The combustible fluid housing 40 has a pump disposed within for transferring the combustible fluid from the combustible fluid housing to the combustible fluid injector 50. The pump includes a conventional electrical motor for dispensing a predetermined quantity of fluid in response to each cyclic operation. The combustible fluid housing is preferably located behind the commode body 20 to separate it from the incineration process.

The injection of combustible fluid into the combustion chamber is allowed when combustion chamber lid 34 is closed. The combustible fluid injector 50 injects a set quantity of combustible fluid into the combustion chamber 30. In the preferred embodiment, this amount is set at two ounces, but this amount can be adjusted by adjusting the pump inside the combustible fluid housing 40 depending on the amount of fecal component that needs to be incinerated.

As shown in FIG. 3, the combustion chamber 30 is provided with a heat source 60 for incinerating the fecal component of human waste. In the preferred embodiment, this heat source 60 is a pair of gas burning torches. As shown in FIG. 2, the gas burning torches are supplied with a gas and pressurized air mixture by a fuel conduit 61. Fuel conduit 61 carries fuel received from a gas source which is intermixed with air via blowers 63. Blowers 63 receive air from the outside environment. The gas burning torches also include a conventional spark igniter. The gas burning torches can be manually activated or electronically activated after the lid is closed. In the preferred embodiment, the two gas torches are offset from one another with their respective nozzles located between the meshers 31 so as to define a gas burning area which encompasses the area between the meshers within the burn chamber. It has been found that two gas blow torches operate effectively and efficiently to burn the fecal matter within the burn chamber. The combustion chamber is enclosed in a housing with air around it to keep the heat within the combustion chamber and away from the user.

To maintain a cool temperature around the combustion chamber 30, air is circulate around the combustion chamber. The combustion chamber 30 is carried within an external housing 65 creating a space between the combustion chamber and external housing for airflow to circulate around the combustion chamber. Cooling air is provided via blower 66 which utilizes air lines 100 and 102 for blowing air around the combustion chamber. Blower 66 receives air from the outside environment.

Figure 4:
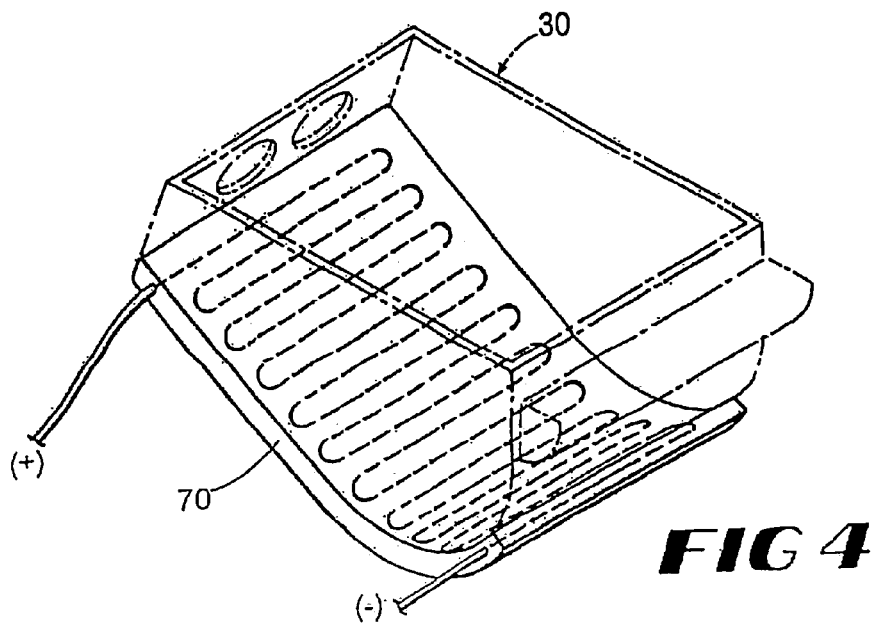
FIG. 4 illustrates a pre-heating element in conjunction with the combustion chamber.

In addition to gas burning torches for incinerating the fecal component of human waste, as shown in FIG. 4, an additional heat source 70 may be located beneath the combustion chamber 30 to preheat the combustion chamber prior to the incineration process. Preheating the combustion chamber allows for the gas burning torches to burn the fecal component more efficiently because less energy is wasted heating the combustion chamber. In the preferred embodiment, this heat source 70 is an electric heat plate located directly beneath and in contact with the bottom wall of the combustion chamber.

As shown in FIGS, 3 and 5, the rear of combustion chamber 30 is open to communicate with flue 72 which communicates with a vent either to the ambient environment or to a fire proof bag 105. When the combustion chamber is closed, the heat produced from the gas burning torches, will burn the fecal matter producing ash. A valve 126 operates to communicate flue 72 with the fire-proof bag 105 directing the ash to the fire proof bag 105 when the incineration phase of the incinerating commode has been completed.

Figure 5:
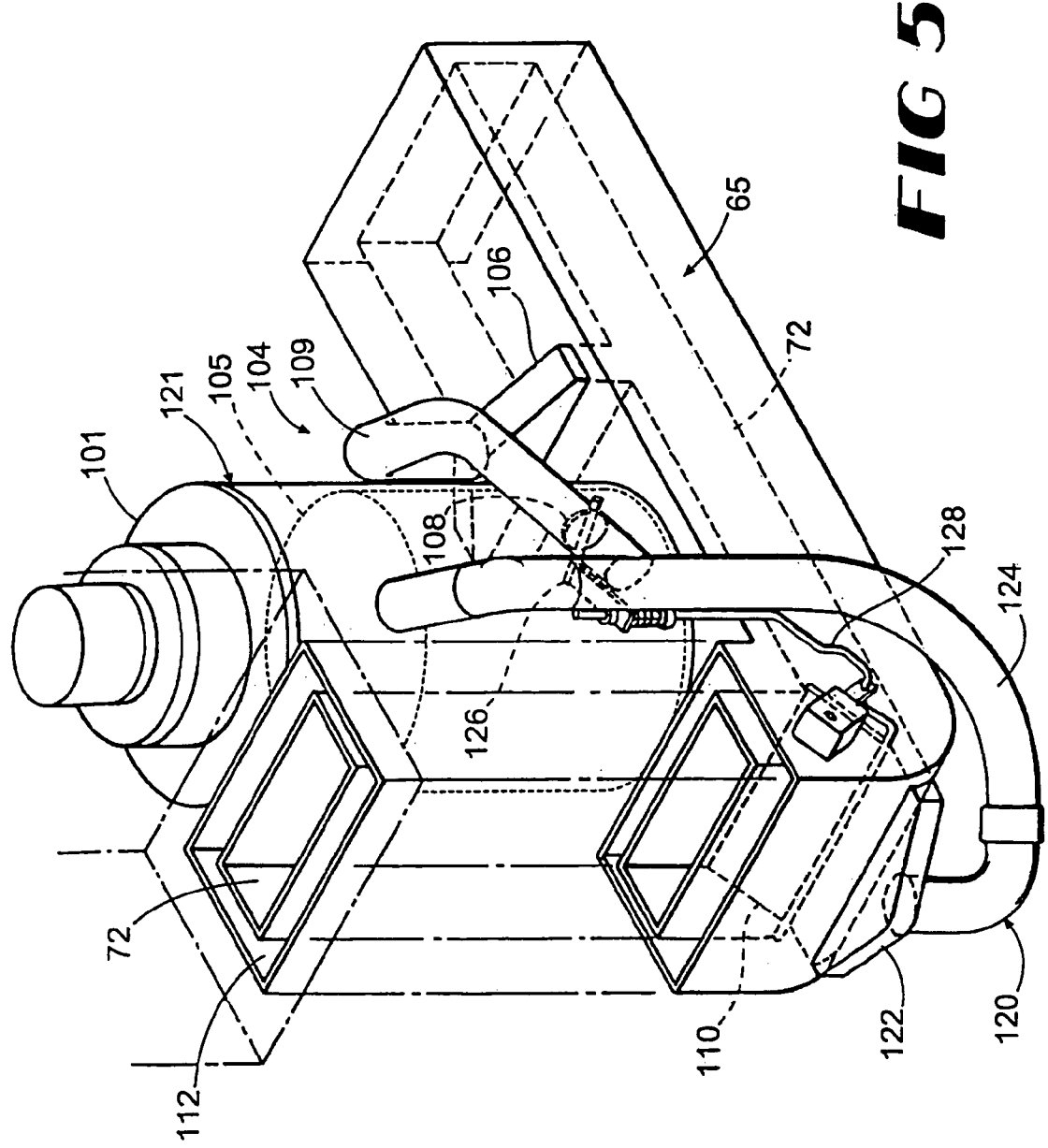
FIG. 5 illustrates the venting system of the incinerating commode according to the present invention.

The control burn of the fecal matter is controlled by a damper 74. As shown in FIGS. 3 and 5, damper 74 (also referred to as "gate 74") is disposed between combustion chamber 30 and flue 72. Preferably, damper 74 is carried by the back wall of combustion chamber 30. Damper 74 includes a plurality of offset tines which defines a plurality of air channels for restricting the flow of air and ash through flue 72. Preferably, the tines are offset by an eighth of an inch. Preferably, damper 74 is cantileverly balanced for maintaining a certain air pressure within the combustion chamber. The gate 74 (e.g.. the damper) is autonomous in regulating the airflow between the combustion chamber 30 and the flue 72, depending on the air pressure within the combustion chamber 30. Initially, when the burning process is initiated, the damper restricts the air within the burning chamber enabling the combustion chamber to be heated within a short period of time. This also subjects the fecal matter to the full heat produced from the gas torches. The velocity of the flames from the gas torches and the turbulence created therein, would normally carry some of the fecal matter through the flue prior to being incinerated. This is an undesired result and the damper maintains the fecal matter and most of the hot air within the combustion chamber. Accordingly, while not only is the fecal material maintained within the combustion chamber until incinerated, turbulence is created. This turbulence also assists in burning the fecal material thoroughly. Also, as the fecal matter is burned, less pressure exists within the combustion chamber, accordingly, the counter-balanced damper will automatically rotate in a position to further restrict the passage to the flue and hence maintain the pressure within the combustion chamber to a predetermined pressure. This ensures an even and controlled burn.

These torches may be manually engaged, or timed. The preferred burn time is one and a half minutes. A timer will turn the blow torches off after the desired burn time.

While the fecal material is being incinerated, meshers 31 are continuously oscillating within the burning chamber breaking the solid fecal matter into smaller components. To facilitate in the burning, a combustible fluid is injected into the burning chamber prior to the ignition of the gas torches. This combustible fluid is intermixed with the solid fecal material by meshers 31. Preferably, between two ounces of combustible fluid is intermixed with the fecal matter. After a pre-determined time of fecal matter preparation, the gas torches are ignited initiating the burning process. As the fecal matter is incinerated into ash, the air pressure within the chamber lessens, requiring the damper to minimize the flue opening which communicates with the burning chamber. This process maintains the heat within the burning chamber ensuring that all of the fecal matter is incinerated. A vacuum acts to draw the odors from the combustion chamber and the ash through the flue. The ash is collected in a fire-proof bag 105. A second damper regulates the interaction between the vacuum and the exhaust vent for drawing the odors and ash through the flue depending on which phase of operation the incinerating commode is undergoing, i.e., collection of fecal matter, burning of fecal matter, or steam cleaning of the combustion chamber.

The operation of the vacuum system 121 is illustrated in FIG. 5. Vacuum 101 is utilized for two primary functions. First, vacuum 101 draws the odor away from the incinerating combustion chamber via odor control system 104. Odor control system 104 includes vacuum 101 which interconnects with flue 72 via vacuum odor horn 106 and vacuum odor conduit 109. Odor control valve 108, which is preferably a butterfly valve, opens the vacuum passage between the vacuum and vacuum odor horn from a range of 100%–10% depending on the operation of the incinerating system. The odor control valve is fully open when the combustion chamber is not incinerating the fecal matter. The odor control valve regulates a cross-sectional opening of the odor control conduit so that the cross-section of the odor control conduit is no more than 10% open during the incineration of the fecal matter. Odor is drawn from the open back of the combustion chamber through the flue, through the vacuum odor horn, through the vacuum odor conduit and ultimately to the vacuum.

When the incineration process is undergoing within the combustion chamber, flue 72 is open to the ambient environment via flue damper 110. This enables the heat and flames within the combustion chamber to vent to the ambient environment via vent 112. When the incineration process is ongoing; the odor control valve partially closes so that the vacuum does not interfere with the combustion process and also enables the heat and flames to vent outside and not into the vacuum.

After the combustion process is completed, the vacuum draws the incinerated fecal matter ash from the combustion chamber to the vacuum through ash removal system 120. Ash removal system 120 includes a vacuum ash horn 122 and vacuum ash conduit 124. Ash control valve 126, which is preferably a butterfly valve, opens the vacuum passage between the vacuum and vacuum ash horn from a range of 100%–0% depending on the operation of the incinerating system. The ash control valve 126 is interconnected with flue damper 110 via linkage 128 which is operated by a solenoid.

In operation, when the combustion chamber is incinerating fecal matter, flue damper 110 is opened such that the heat and flames of the incineration process are communicating outward of the flue exit port. In this position, ash control valve 126 is closed. When the incineration process is completed, flue damper 110 closes the flue exit and opens the passageway to communicate the flue with vacuum ash horn 122. Linkage 128 simultaneously opens ash control valve 126 such that the vacuum pulls the ash from the combustion chamber through the ash removal system into the vacuum. While the ash removal process is undergoing, the odor control valve is open 10% for continuously removing odors from the combustion chamber while still enabling most of the vacuum to be functioning for ash removal.

As further illustrated in FIG. 1, a urine collector 80 is carried by the front wall of the commode interior and protrudes into the commode interior 25 to provide a separate receptacle for collecting the urine component of human waste. The urine collector 80 has downwardly converging sidewalls. The bottom edges of the urine collector walls are in fluid connection with a urine conduit 85, which transfers the urine component to a urine container 90. The urine component is separated from the fecal component to promote more efficient incineration of the fecal component.

Alternatively, instead of having the urine collector 80 being attached to the front wall of the commode interior 25, the commode body 20 could consist of two separate compartments, wherein one compartment would have the same general characteristics as the urine collector 80 described hereinabove.

As shown in FIG. 1, a cleaning agent which is preferably chlorine is stored within tank 92. The chlorine is used to spray the interior of the commode body during use by an individual. The spray nozzles 94 are located underneath the rim of the toilet seat and spray downwards. The chlorine is collected in the urine collector 80 and in the combustion chamber and is intermixed with the fecal matter by the meshers. The addition of chlorine and combustion fluid to the fecal matter assists in breaking up the fecal matter which facilities in a clean bum.

As additionally shown in FIG. 2, the preferred embodiment utilizes the separately collected urine as a cooling system for cooling and cleaning the interior of the commode. The cleaning agent is gravity fed to urine container 90 through the urine collector 80 for intermixing with the urine. The chlorine/urine mixture is pumped through cleaning fluid line 95 which interconnects with the gas lines at the distal end of the gas lines 61 for atomizing the cleaning mixture into the interior of the combustion chamber.

After the incineration phase has occurred, the transmission of combustible gas through gas lines 61 is terminated while the air from blowers 63 continues through lines 61. The result is that the chlorine/urine mixture is blown into the combustion chamber under pressure enabling the chlorine/urine mixture to be dispersed throughout the interior of the combustion chamber. Consequently, the hot surface temperature of the interior of the combustion chamber reacts with the chlorine/urine mixture producing a steam cleaning effect. The addition of the chlorine to the urine eliminates any odor caused by the urine being used as a steam cleaning agent. Also, the urine container 90 is in communication with the blowers 63, so that the collected urine may be used as a component of a cooling fluid. The cooling fluid may be blown into combustion chamber 30 by the blowers 63 for the purpose of cooling the combustion chamber 30 after fecal component incineration.

A timer controls the operation of the cleaning cycle. Preferably, the burn cycle time is one and a half minutes. After the burn cycle time, the timer controls the dispersion of the cleaning fluid into the hot combustion chamber. The cleaning fluid of urine and preferably chlorine is presented to the combustion chamber for another minute resulting in the combustion chamber being steam cleaned and cooled.

In operation it is preferred that the commode is vented to the exterior of the corresponding water closet and outside. Such venting prevents the commode from drawing air from the immediate vicinity which would result in a drop in ambient temperature from the removal of the ambient air to the environment.

In operation, the total operation time is preferably three minutes. This operation includes, preparing the fecal matter for burning by injecting a combustible fluid, and preheating the burning chamber; the burning of the fecal matter; and finally the steam cleaning of the burning chamber. By removing the urine from the fecal matter, injecting a combustible fluid which is intermixed with the fecal matter, utilizing a venting gate, utilizing two gas torches, the burn time and cost of burning the fecal matter is greatly reduced from prior incinerating commodes.

What is claimed is:

1. An incinerating commode for use in disposing of human waste comprising:
    a commode body having a commode interior;
    a combustion chamber in communication with said commode interior for receiving a fecal component of said human waste;
    a urine collector carried within said commode interior for receiving a urine component of said human waste;
    a heat source for incinerating said fecal component;
    a blower for injecting a cooling fluid onto said combustion chamber for cooling said combustion chamber after said fecal component incineration; and
    in which a urine conduit is in communication with said urine collector and a urine container, which in turn is in communication with the blower by a cleaning fluid line and there are means to purify the urine before it is injected by the blower.

2. The commode of claim 1 in which the means of purifying the urine is by the addition of chlorine to the urine collector.

* * * * *